May 27, 1952 G. A. LYON 2,597,882
HUBCAP
Filed Sept. 30, 1947
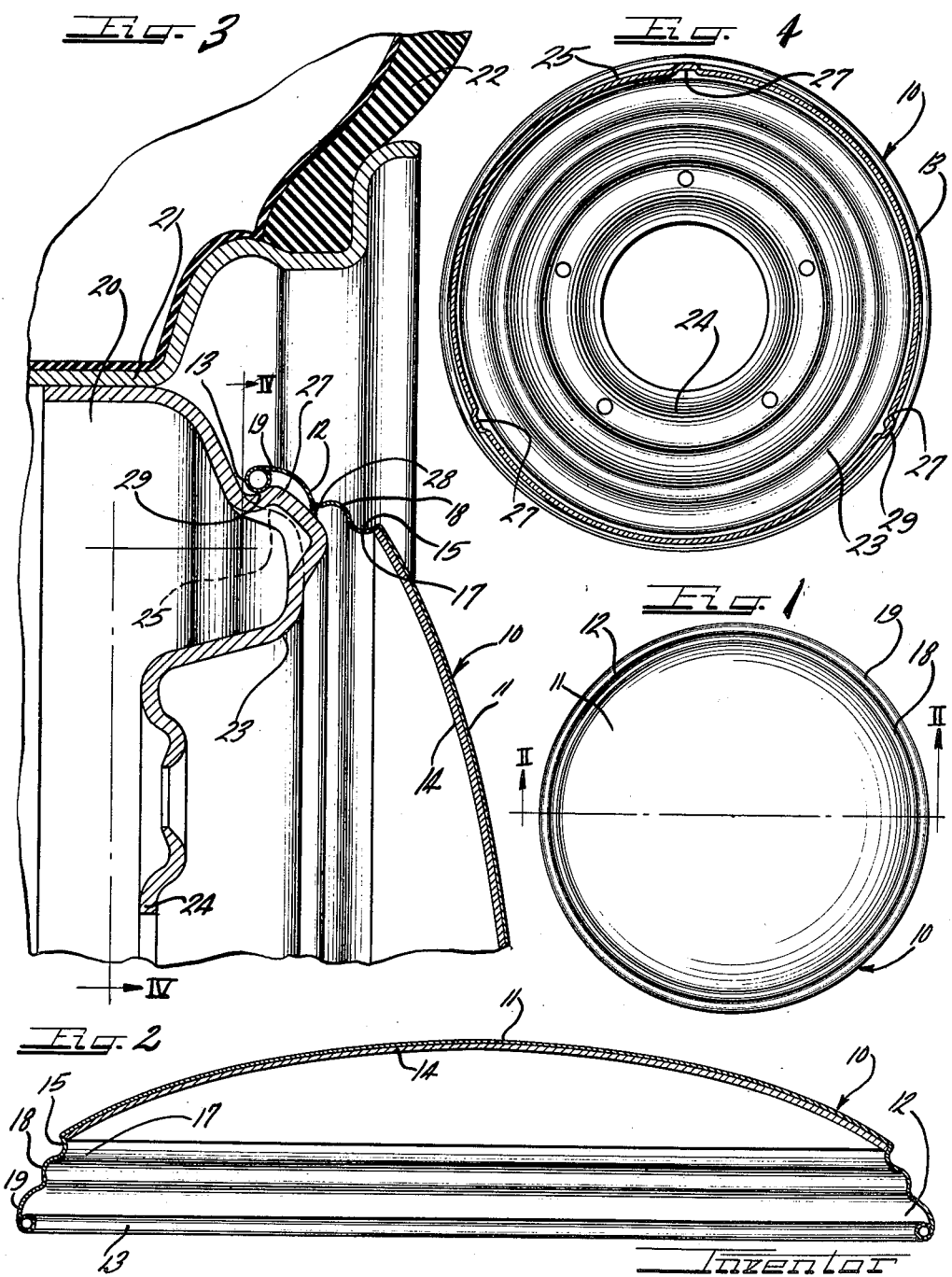
Inventor
GEORGE ALBERT LYON Patented May 27, 1952

2,597,882

UNITED STATES PATENT OFFICE 2,597,882

HUBCAP

George Albert Lyon, Detroit, Mich.

Application September 30, 1947, Serial No. 776,974

6 Claims. (Cl. 301—108)

1

This invention relates to improvements in hub caps and more particularly hub caps such as are used as covers on vehicle wheels.

An important object of the present invention is to provide an improved hub cap type wheel cover structure composed principally of a lightweight resilient material.

Another object of the invention is to provide an improved hub cap having a resilient marginal structure and a central portion which is substantially unaffected by deflections occurring in the marginal structure as a result of applying the hub cap to a wheel.

A further object of the invention is to provide a hub cap which is adapted to be formed from exceptionally thin material and has a snap-on, pry-off marginal formation if improved resilience and retaining ability.

Still another object of the invention is to provide and improved hub cap type of wheel cover formed principally of relatively thin material and having a novel central reinforcement structure.

A still further object of the invention is to provide an improved hub cap having an internal crown reinforcement and novel means for retaining such reinforcement in the assembly.

According to the general features of the invention, there is provided a hub cap formed from thin sheet metal and having a generally uniformly convex crown of relatively large radius and a marginal flange extending in a generally axial direction from the edge of the crown and formed at its extremity with a reinforcing bead adapted to engage in snap-on, pry-off relationship with retaining bumps on a wheel structure, said margin between the bead and the edge of the crown including a plurality of rib-like undulations supplementing the bead and affording a high degree of resiliency for the margin.

According to other features of the invention, a convex reinforcing plate is disposed in reinforcing relation to the inner face of the crown and the edge of such plate is secured by the undulation of said margin proximate to the crown edge.

According to additional general features of the invention, there is provided a hub cap having a crown portion and a flexible margin for retainingly engaging the hub cap upon a wheel structure, the crown portion having a reinforcing plate on the inner side thereof, and an annular crimp in the hub cap at the juncture of the crown with the flexible margin retaining said plate in reinforcing relation to the crown.

2

Other objects, features and advantages of the present invention will be readily apparent from the following detailed description taken in conjunction with the accompanying drawings disclosing a preferred embodiment in which:

Figure 1 is a side elevational view of a hub cap embodying the features of the invention;

Fig. 2 is an enlarged diametrical sectional view through the hub cap taken substantially on line II—II of Fig. 1;

Fig. 3 is a fragmentary enlarged radial sectional view through the hub cap and a wheel structure to which the hub cap is adapted to be applied; and Fig. 4 is a reduced scale sectional elevational view taken substantially on line IV—IV of Fig. 3 and showing the entire circumference of the hub cap.

As shown on the drawings:

A hub cap 10 embodying the features of the invention comprises a relatively long radius convex crown 11 and a resilient marginal annular flange formation 12 terminating in an inwardly curled reinforcing and wheel engaging bead 13.

The hub cap 10 is so constructed that the crown 11 and the marginal flange 12 are adapted to be made from a single thin sheet metal stamping but nevertheless the crown is maintained relatively rigid and non-yielding while the flange 12 is flexibly deflectable to accommodate retaining means on a wheel to which the hub cap may be applied. To this end, the crown portion 11 of the hub cap is reinforced by means of a dished stiffening plate 14 which is complementary in shape and diameter to the crown 11 and is secured in face-to-face relation with the inner surface of the crown. For example, where the crown and marginal flange of the hub cap are formed from a piece of stainless steel of .015 thickness, the reinforcing plate 14 may be formed from .025 hard steel. Thus, the combined thickness of the crown 11 and the stiffening plate 14 affords a substantial degree of rigidity in the crown which resists buckling when the hub cap is pushed into assembly on a wheel and also successfully resists indenting or other damage due to driving the same against obstructions such as curbing, or the like.

For securing the reinforcing plate 14 in the hub cap assembly, the edge thereof is engaged by a crimp 15 formed in the marginal flange 12 at the juncture of the latter with the edge of the crown portion 11 of the hub cap. As shown herein, the crimp 15 preferably takes the form of an annular groove which may be rolled in the juncture portion of the margin 12 and provides a radially inwardly projecting rib 17 confiningly opposing the edge of the reinforcing plate 14. At the same time the rib 17 affords reinforcement and resiliency increasing structure for the margin 12.

In addition to the reinforcement afforded in the margin 12 by the rib 17, reinforcement is provided by a further and contiguous rib 18 which is formed by annularly outwardly bulging the flange 12 immediately adjacent the rib 17. Thus, the rib 18 provides a symmetrical undulation or corrugation which in addition to its reinforcing function also affords a pleasing appearance for the exterior of the hub cap.

By preference, the marginal flange 12 of the hub cap is formed on a generally frusto-conical or tapering plane extending generally axially and slightly radially outwardly from the edge of the crown portion 11. This tapering plane is, however, broken by the rib or corrugation undulations 15 and 18, the latter being narrower than and merging with a terminal portion 19 comprising a formation to facilitate flexure of the flange such as a relatively wide, outwardly bulging rib or corrugation extending to the bead 13 and comprising approximately half the width of the marginal flange 12. Thus is provided a marginal flange structure which is relatively strongly resiliently resistive to deflection but which is, nevertheless, adequately deflectable for engagement in snap-on pry-off relation to a vehicle wheel. By reason of the crown reinforcement by means of the plate 14, resilient deflections of the marginal flange 12 do not affect the crown 11 which retains its symmetry irrespective of any deflections of the flange 12.

The exterior of the hub cap 10 may be provided with a lustrous finish as by polishing the same or with any other finish or combination of finishes.

The hub cap 10 is particularly adaptable for use with a wheel of the kind disclosed in my copending Patent No. 2,445,330, issued July 20, 1948. Such a wheel is shown fragmentarily in Figs. 3 and 4, and includes a wheel body 20 and a tire rim 21. The tire rim is of the conventional drop center type adapted to receive a pneumatic tire and tube assembly 22 in the usual manner.

The wheel body 20 is preferably formed as a sheet metal stamping having the outer periphery thereof secured to the base flange of the tire rim 21 in a suitable manner such as by welding or riveting. An intermediate axially outwardly projecting annular nose bulge 23 on the wheel body defines a central dished bolt-on flange 24 and has formed at the radially outer side thereof a generally radially facing shoulder 25 from which protrude generally radially outwardly hub cap retaining bumps 27. The diameter across the inside of the hub cap bead 13 is preferably slightly greater than the greatest diameter across the shoulder 25, and the bumps 27 are formed on a circle which is of slightly greater diameter than said diameter within the bead 13. Hence, when the hub cap is pressed home against the wheel, the bead 13 and the contiguous areas of the marginal flange 12 of the hub cap are deflected radially outwardly where the bead engages the bumps 27 while the intermediate portions of the bead and flange are deflected inwardly against the shoulder 25 as best seen in Fig. 4 thereby adapting the marginal flange 12 to the bumps by generally cloverleaf deflection and effecting a retaining attachment of the hub cap on the wheel. As best seen in Figure 3, the bumps 27 are formed with a lead-in cam surface 28 and an undercut retaining shoulder 29 which is formed throughout on a circular greater diameter than the contiguous base portion of the annular shoulder 25, whereby the edge of the hub cap is maintained in a stretched condition. As best seen in Fig. 4, when the bead 13 is flexed outwardly by the bumps 27 and held thus by the bump shoulders 29, the intermediate portions of the bead are drawn radially inwardly into engagement with the shoulder 25. This affords a strong retaining grip of the hub cap on the bumps and shoulder which resists unintentional displacing forces but permits the hub cap to be pried free from the wheel by the application of a pry-off tool between the bead 13 and the adjacent body of the wheel adjacent to one of the bumps. As shown, there are three of the bumps 27 formed symmetrically about the wheel body reinforcing bump 23 but there may be more of such bumps if desired.

I claim as my invention:

1. A wheel cover formed from thin sheet metal and having a generally uniformly convex crown and a marginal flange extending in a generally axial direction from the edge of the crown and formed at its extremity with a reinforcing bead adapted to engage in snap-on pry-off relationship with retaining bumps on a wheel structure, said margin between the bead and the edge of the crown including a plurality of rib-like undulations supplementing the bead and affording a high degree of resiliency for the margin, and a concave reinforcing plate disposed in reinforcing relation to the inner face of the crown, the edge of such plate being secured by the undulation of said margin proximate to the crown edge.

2. A hub cap type wheel cover having a crown portion and a flexible margin for retainingly engaging the hub cap upon a wheel structure, the crown portion having a reinforcing plate on the inner side thereof, and an annular crimp in the hub cap at the juncture of the crown with the flexible margin retaining said plate in reinforcing relation to the crown.

3. In combination in a wheel cover structure, a wheel cover body formed from thin sheet metal and including a curved crown portion and a marginal flange portion having means thereon for retaining engagement with a wheel, and a complementary stiffening plate of heavier gauge interiorly engaging the crown portion and having its edge contiguous the juncture of the crown portion and the flange portion, said marginal flange being crimped in at its juncture with the crown portion and engaging the edge of the stiffening plate to hold the latter in assembly in the structure.

4. In a wheel cover structure, a crown portion, an integral marginal flange portion, a reinforcing and backing plate interiorly engaging the crown portion and being of a diameter substantially coincident with the diameter of the crown portion, said marginal flange portion having a plurality of annular corrugations, the corrugation nearest the edge of the reinforcing plate opposing such edge and retaining the plate in assembly.

5. In combination in a wheel cover assembly, a crown portion formed from thin sheet metal, a marginal flange portion integral and formed in one piece with the crown portion, a stiffening plate complementary to and snugly interiorly engaging the crown portion and being of substantially the same diameter as the crown portion, said marginal flange portion including a plurality of annular reinforcing corrugations and having a reinforcing and hub cap-retaining-bump-engaging bead at the terminal edge thereof, said corrugations and bead rendering the marginal flange portion strongly resiliently flexible, said plate rendering the crown portion stiff and unaffected by flexure of the flange portion, the corrugation nearest the crown portion having an inturned annular section engaging the edge of said stiffening plate and retaining the plate snugly against the crown in reinforcing position.

6. In combination in a wheel cover structure, a wheel cover body formed from thin sheet metal and including a crown portion and a marginal flange portion, said flange portion having means thereon for engaging retaining means on a wheel, and a stiffening plate interiorly engaging and reinforcing the crown portion and having the edge of the stiffening plate disposed continguous said flange portion, said marginal flange portion having a radially inwardly projecting retaining crimp retainingly opposing the edge of the stiffening plate to maintain the stiffening plate in reinforcing relation to said crown portion.

GEORGE ALBERT LYON.

REFERENCES CITED

The following references are of record in the file of this patent:

UNITED STATES PATENTS

| Number | Name | Date |
|---|---|---|
| 2,148,211 | Lyon | Feb. 21, 1939 |
| 2,200,205 | Lyon | May 7, 1940 |
| 2,263,243 | Lyon | Nov. 18, 1941 |
| 2,326,788 | Lyon | Aug. 17, 1943 |